US009927256B2

(12) United States Patent
Rosellini et al.

(10) Patent No.: US 9,927,256 B2
(45) Date of Patent: Mar. 27, 2018

(54) CALIBRATION OF VIBRATING GYROSCOPE

(71) Applicant: SAGEM DEFENSE SECURITE, Paris (FR)

(72) Inventors: Lionel Rosellini, Paris (FR); Mathieu Bresson, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 706 days.

(21) Appl. No.: 13/627,485

(22) Filed: Sep. 26, 2012

(65) Prior Publication Data

US 2013/0204565 A1 Aug. 8, 2013

(30) Foreign Application Priority Data

Sep. 26, 2011 (FR) .................................... 11 02909

(51) Int. Cl.
*G01C 25/00* (2006.01)
*G01C 19/56* (2012.01)

(52) U.S. Cl.
CPC ............. *G01C 25/00* (2013.01); *G01C 19/56* (2013.01); *G01C 25/005* (2013.01)

(58) Field of Classification Search
USPC .................................................. 702/92, 104
See application file for complete search history.

(56) References Cited

U.S. PATENT DOCUMENTS

| 6,598,455 B1 | 7/2003 | Gutierrez et al. |
| 2009/0095078 A1 | 4/2009 | Rozelle |
| 2009/0157340 A1* | 6/2009 | Gopalan et al. ................. 702/85 |
| 2009/0255334 A1* | 10/2009 | Cheung et al. .................. 73/460 |
| 2010/0058831 A1* | 3/2010 | Jeanroy et al. ................ 73/1.82 |
| 2010/0095771 A1* | 4/2010 | Lignon ................ G01C 19/567 73/504.12 |
| 2011/0259100 A1* | 10/2011 | Chen et al. ................ 73/504.12 |

OTHER PUBLICATIONS

Shkel, "Type I and Type II Micromachined Vibratory Gyroscopes", Institute of Electrical and Electronics Engineer/Institute of Navigation Plans 2006, pp. 586-593.
Sungsu, et al., "Adaptive Control for the Conventional Mode of Operation of MEMS Gyroscopes", Journal of Microelectromechanical Systems, vol. 12, No. 1, Feb. 2, 2003.

(Continued)

*Primary Examiner* — Mischita Henson
*Assistant Examiner* — Christine Liao
(74) *Attorney, Agent, or Firm* — Cozen O'Connor

(57) ABSTRACT

In a gyroscopic system, a vibrating gyroscope is controlled in gyrometer mode in a control loop. The control loop corresponds to at least one current control for an operating parameter. In the control loop, a modified control to be applied to the gyrometer for said operating parameter is obtained (11) by introducing a sinusoidal interference into the current control. Then, the modified control is applied (12) to the gyrometer as the current control. A resulting measurement value (13) is determined. A sinusoidal interference (14) is calculated as a function of said measurement value. Lastly, on the basis of the measurement value, it is decided (15) whether to repeat the previous steps on the basis of the sinusoidal interference last determined.

13 Claims, 2 Drawing Sheets

(56) References Cited

OTHER PUBLICATIONS

R.P. Leland, "Adaptive Control of a MEMS Gyroscope using Lyapunov Methods", IEEE Transactions on Control Systems Technology, vol. 14, No. 2, Mar. 1, 2006, pp. 278-283.
Shkel et al., "Dynamics and Control of Micromachined Gyroscopes", American Control Conference, vol. 3, Jun. 2-4, 1999, pp. 2119-2124.

* cited by examiner

CALIBRATION OF VIBRATING GYROSCOPE

RELATED APPLICATION

This application claims the priority of French application no. 11 02909 filed Sep. 26, 2012, the entire content of which is hereby incorporated by reference.

The invention relates to vibrating gyroscopes using a principle based on the Coriolis effect, and relates more particularly to the accuracy of measurements provided by this type of gyroscope.

BACKGROUND OF THE INVENTION

As with any measurement device, a calibration step must first be performed for a vibrating gyroscope. This is a step during which the corrections to be made to the unadjusted measurement value from the device are defined in order to improve its precision as a function of various additional measured parameters, such as the temperature, so that this measurement device operates accurately.

Conventionally, a vibrating gyroscope is calibrated before being used. It can be calibrated when it leaves the factory, for example.

In certain systems, a gyroscope is used by compensating for its bias and scale factor errors. In other systems, an internal calibration is applied to the gyroscope or gyroscopes used. Such internal calibration consists of determining correction coefficients within a control loop of the gyroscope concerned. For vibrating gyroscopes, such an internal calibration is based on a rotation of the position of vibration. The operating mode of the gyroscope allows measuring an absolute angle of rotation on the basis of a measurement of an angle representing the position of vibration of the gyroscope relative to measurement electrodes.

However, it is not possible to apply such a correction to a gyroscope used in gyrometer mode. In this mode, the position of vibration of the vibrating gyroscope is maintained in a fixed position, and the measurement is deduced from the control that must be applied to the gyroscope to maintain it in that fixed position of vibration. The values supplied by the physical measurement then no longer correspond to an angle but to a speed of rotation.

SUMMARY OF THE INVENTION

One object of the invention is to improve the situation.

A first aspect of the invention is directed to a method for calibrating a vibrating gyroscope, said vibrating gyroscope supplying measurements and being controlled in gyrometer mode in a control loop, said control loop comprising at least one current control for an operating parameter, said calibration method comprising the following steps in the control loop:

/a/ obtaining a modified control to be applied to the gyrometer for said operating parameter by introducing a sinusoidal interference in the current control;

/b/ applying the modified control to the gyrometer as the current control;

/c/ determining a measurement value resulting from step /b/;

/d/ identifying a correction value for the operating parameter on the basis of a correlation between the measurement value and the modified control;

said correction value being applied to the next measurements supplied by the gyroscope.

The term "control loop" is understood to mean a loop which controls the vibrating gyroscope in its position of vibration. Operating parameter is understood to mean any parameter characteristic of the vibration, such as a vibration amplitude for example. Here, at least one control for an operating parameter is applied to the vibrating gyroscope in this control loop. The term "operating parameter" is understood to mean a parameter relative to the operation of the gyroscope in the sense where a change of this parameter induces a change in the result measured by the vibrating gyroscope. Such an operating parameter may be related to the stiffness of the gyroscope vibration, or the position of the gyroscope vibration, or the amplitude of the gyroscope vibration, or as a further example the quadrature of the gyroscope vibration.

The term "control" is understood to mean a signal which controls the gyroscope relative to a given operating parameter. Different types of controls respectively correspond to different types of parameters.

This control is inventively modified by injecting a sinusoidal interference so as to vary the measurement output by the gyroscope. Thus one can excite different defects in the system without rotating its angular position. The term "sinusoidal interference" is understood to mean adding a sine signal to the current control.

No limitation is placed on the definition of such a sinusoidal interference.

The term "measurement" or the terms "measurement signal", "output signal from the gyroscope", "detection", "observation", and similar terms are understood to mean a signal output by the gyroscope.

Using such characteristics, it is possible to calibrate a vibrating gyrometer, meaning a vibrating gyroscope controlled in gyrometer mode, within its control loop while respecting the operating constraint of a gyrometer: not rotating its position of vibration. Ingeniously, a control is modified in the control loop so as to slightly disrupt the control loop without causing the position of vibration of the vibrating gyroscope to rotate. By introducing a sinusoidal interference in a control of the control loop, it is possible to detect the reaction of the vibrating gyroscope to certain carefully chosen changes. This reaction is readable in the signal output by the gyroscope, meaning in the measurements provided by the gyroscope. On the basis of these reactions, it is then possible to correct certain defects of the vibrating gyroscope concerned.

By thus correlating the measurement value resulting from step /c/ with the modified control applied upstream from step /b/, it is possible to establish a relationship between these sinusoidal interferences in the control and the resulting observations in order to deduce a correction to the errors related to this vibrating gyroscope operating in gyrometer mode.

This calibration method allows limiting the effects of aging. It allows adjusting the applied corrections to changes in external operating conditions, such as temperature or humidity for example.

In one embodiment of the invention, an equation associated with the control loop links a control applied to the gyroscope and a resulting measurement value; step /d/ is then based on this equation.

The following equation can thus be considered to be satisfied:

$$EU=f(X)$$

f being a function having as input parameter the measurement or "detection" signal, U being the control applied, and E being an error to be corrected.

Under these conditions, it remains to determine E in order to be able to identify a correction value to be applied to the measurements provided by the gyroscope.

Advantageously, this calibration method may be an iterative process. The steps consisting of disrupting the control(s) applied to the vibrating gyroscope, in order to deduce correction measurements, may be repeated as long as a convergence criterion Is not satisfied.

This method of calibrating a vibrating gyroscope may then additionally comprise the following step:

/e/ deciding, on the basis of step /d/, to repeat steps /a/ to /d/ as long as a convergence criterion is not satisfied.

Here it is decided to repeat these steps as a function of the correlation made between the modified control and the measurement value obtained as a result.

It is possible to implement such a method relative to one or more operating parameters, by applying one or more controls corresponding to these respective operating parameters.

In order to correct errors related to an axisymmetric vibrating gyrometer, meaning a gyroscope vibrating in a fixed position of vibration, in one embodiment modulations can be applied to the concerned control for an operating parameter, or to the different controls, around a feedback-controlled position. These modulations allow introducing sinus disturbances in a controlled manner. Then, on the basis of these modulations, a link can be made between the controls and the results detected at output, meaning the measurements provided as output by the gyroscope.

This method of iterative calibration allows limiting the effect of aging. It allows adjusting the applied corrections to changes in external operating conditions, such as temperature or humidity for example.

This method can be repeated for the length of a temperature cycle and it can thus allow modeling different defects as a function of temperature.

In one embodiment of the invention, the convergence criterion is satisfied if the correction value for the operating parameter is less than a threshold value.

In one embodiment of the invention, the sinusoidal interference P applied to the controls satisfies the following equation:

$$P = k \cdot \sin(2 \cdot \pi \cdot f_{mod})$$

where k is an amplitude value for the applied interference, and where $f_{mod}$ is a value of the frequency of the applied interference.

By disrupting a control applied to the vibrating gyroscope by such a sinusoidal interference, it is possible to determine a reaction of the gyroscope to this interference, which allows calibrating the gyroscope in a relevant manner. Such a sinusoidal interference is particularly suitable for control loop calibration of a vibrating gyroscope in gyrometer mode according to an embodiment of the invention.

In one embodiment of the invention, the measurements from the gyroscope are relative to an amplitude estimate, a phase error estimate, a position error estimate, or a quadrature estimate.

Applying the invention to at least one of these operating parameters allows a relevant calibration of the vibrating gyroscope. Of course, it is possible to apply the invention sequentially to all the operating parameters listed above in order to obtain a more precise calibration of the vibrating gyroscope.

In one embodiment of the invention, the measurements from the gyroscope are supplied in vector form and are corrected using a detection matrix (A).

In one embodiment of the invention, the current control is relative to an operating parameter from among a parameter relative to an amplitude, a parameter relative to a stiffness, a parameter relative to a precession, and a parameter relative to a quadrature.

Applying the invention to at least one of these operating parameters provides a relevant calibration of the vibrating gyroscope. Of course, it is possible to apply the invention sequentially to all the operating parameters listed above in order to obtain a more precise calibration of the vibrating gyroscope.

In one embodiment of the invention, the modified controls to be applied are determined in parallel in matrix form, using a control matrix.

In one embodiment of the invention, the control can be at a frequency substantially equal to the natural frequency of the vibrating gyroscope or at a frequency substantially two times greater than the natural frequency of the vibrating gyroscope. The control mode at the natural frequency of the gyroscope is called the conventional control mode and the control mode at a frequency substantially two times greater than the natural frequency of the gyroscope is called the parametric control mode.

A second aspect of the invention relates to a gyroscopic system adapted to implement a calibration method according to the first aspect of the invention.

BRIEF DESCRIPTION OF THE DRAWINGS

Other features and advantages of the invention will be further apparent from reading the following description. This is purely illustrative and is to be read with reference to the attached drawings, in which.

DETAILED DESCRIPTION OF THE DRAWINGS

Below, the invention is described as it applies to type I gyroscopes. These type I gyroscopes correspond to axisymmetric Coriolis Vibratory Gyroscopes (CVG), for example Hemispherical Resonance Gyroscopes (HRG), such as those described in the document 'Type I and Type II micromachined vibratory gyroscopes' by Andrei M. Shkel, pages 586-593, IEEE/ION (Institute of Electrical and Electronics Engineer/Institute Of Navigation, PLANS 2006, San Diego, Calif., USA).

Also below, the terms "measurement", "measurement signal", "gyroscope output signal", "detection", and similar terms are used in an equivalent manner.

Figure 1:
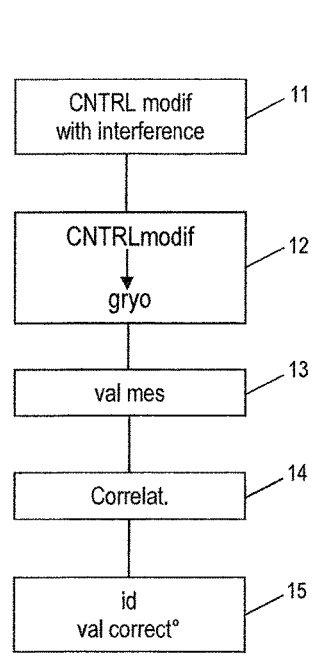
FIG. 1 illustrates the main steps of a calibration method in a gyroscopic system according to an embodiment of the invention.

FIG. 1 illustrates the main steps of a calibration method in a gyroscopic system according to an embodiment of the invention.

The vibrating gyroscope is controlled in gyrometer mode in a control loop. The control loop corresponds to at least one current control for an operating parameter.

In a step 11, a modified control to apply to the gyrometer for the operating parameter is obtained by introducing a sinusoidal interference in the current control. Then, in a step 12, the modified control is applied to the gyrometer as a current control.

Then, in a step 13, a measurement value resulting from step 12 is determined. In a step 14, the measurement value obtained in step 13 is correlated with the modified control applied in step 12.

In one embodiment, this correlation step 14 is based on an equation which establishes a correspondence between the control applied to the gyroscope concerned and the measurement value provided by the gyroscope resulting from applying said control. In other words, such an equation represents a reaction of the vibrating gyroscope to a control that is applied to it.

Using such an equation for the reaction of the gyroscope, a set of equations can be obtained in which the unknown or unknowns are relative to an error of the gyroscope with regard to an operating parameter or several operating parameters.

In order to obtain such a set of equations, one can model the control applied to the gyroscope and assign it an error component as an unknown to be identified according to an embodiment. Then a modeling of the measurement signal output from the gyroscope can be deduced. Next, the set of equations is obtained by applying the equation for the reaction of the gyroscope, which links the control applied to the measurement signal of the gyroscope.

Then in step 15, a correction value to be applied to the gyroscope is identified, on the basis of the correlation in step 14.

Such a method may be implemented iteratively until a convergence criterion relative to the correction value identified in step 15 is met. In this case, the method additionally comprises a step 16 (not represented in FIG. 1) of deciding whether to repeat steps 11 to 15, based on the result of the step 15 of identifying the correction value.

In one embodiment of the invention, the correlation made in step 14 between the modified control and the resulting measurement value obtained allows identifying a correction value to be applied to the operating parameter corresponding to this modified control. Then, in step 16, it can be decided whether or not to repeat steps 11 to 15 based on a convergence criterion of the method, which may be reached for example when the correction to be made to the operating parameter concerned is less than a threshold value.

Thus when the convergence criterion is reached, the calibration method is stopped.

No limitation is placed on the type of convergence criterion used in step 16. This convergence criterion may be based on defining a threshold correction value below which it is possible to stop the method. By defining a threshold value, it is possible to define a compromise between the speed of the convergence of the method and a quality level for the correction to the gyroscope measurement. The higher the threshold value the faster the convergence of the method, but the correction then applied to the gyroscope is less precise. On the other hand, the lower the threshold value the more accurate the correction applied to the gyroscope, but the slower the convergence of the method.

Figure 2:
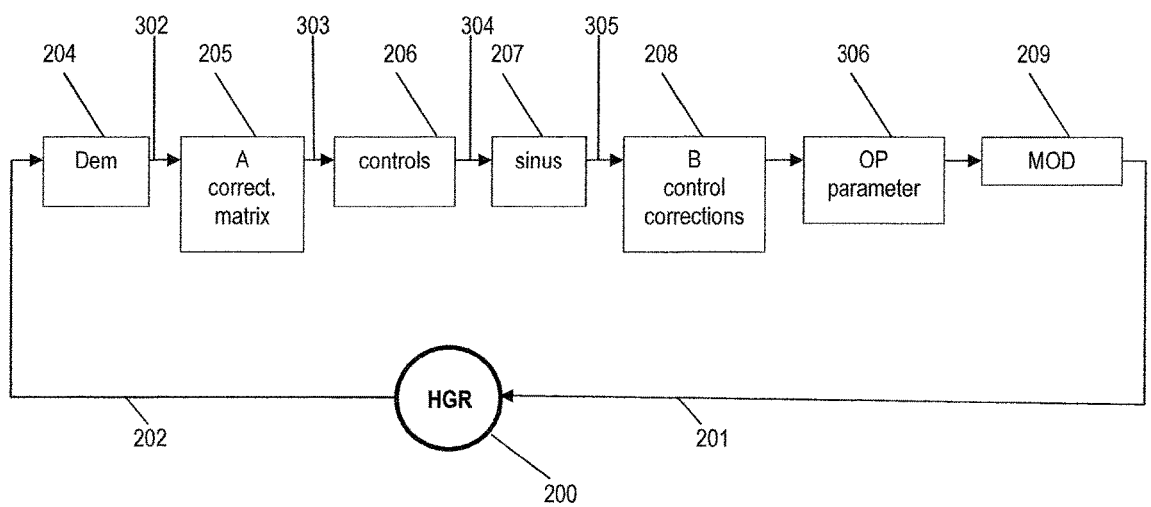
FIG. 2 illustrates an implementation of the calibration method in a gyroscopic system according to an embodiment of the invention.

FIG. 2 illustrates a block diagram of the implementation of corrections identified by calibration within the gyroscopic loop according to an embodiment of the invention.

Purely for illustrative purposes, a calibration method of the invention is described as it applies to a plurality of operating parameters and therefore to a plurality of controls to be applied to the gyroscope. Thus the implementation of this method is managed below using a matrix. Of course, from this it is easy to deduce an embodiment applied to a single operating parameter, which would not require using a matrix.

In one embodiment of the invention, the gyroscopic system comprises a gyroscope in axisymmetric vibrating gyrometer mode within a control loop. Such a gyroscope is referred to below as "gyrometer" 200.

The gyrometer 200 is adapted to be controlled by the input of one or more controls as analog signals 201, and to output 202 measurements as an analog signal in response to the controls received as input. The reaction of the gyroscope can be modeled according to a transfer function H. Initially one can consider the vibrating gyrometer to be operating as an integrator between the signal of the input controls and the signal supplied as output.

The analog signal 202 output from the gyrometer 200 is converted to a digital signal by an ADC converter (analog-to-digital converter), not illustrated. Then the digital signal obtained as output from the ADC is demodulated by a demodulator 204. The demodulator outputs an estimate 302 of the measurement signal provided by the gyroscope for at least one value of the measurement signal from among the following values: an amplitude value, a phase value, an angle value, and a quadrature value output from the ADC.

Then this estimate of the demodulated measurement signal is corrected by taking into account correction values, obtained according to an embodiment, which allow compensating for errors such as those introduced by the electronic elements for detecting the measurements of the vibrating gyroscope. A measurement correction unit 205 is adapted to apply these correction values to the estimate of the demodulated signal, according to an embodiment.

One may note that during the first iteration of the calibration, the correction values are initialized to a chosen value. In an example embodiment, the corrections may be initialized to zero.

This measurement correction unit 205 here is specifically adapted to apply the correction value or values to the measurement signal, relative to each operating parameter considered.

The correction unit 205 handles such correction value identification for one or more types of operating parameter managed in an embodiment. When several operating parameters are calibrated according to an embodiment, the measurement correction unit manages the correction values in matrix form in order to apply them in matrix form to the estimated measurement signal. In this manner, a measurement signal 303 corrected according to an embodiment is obtained as output from the measurement correction unit 205.

This measurement correction unit 205 is adapted to correct different errors induced by the system, particularly by the electronics of the system and by the defects of the gyroscope concerned.

Then the corrected signal output from the gyroscope is integrated by an integration unit PI (for Proportional Integral) in a control unit 206 in order to produce controls, or a control signal 304, based on the signal received as input.

In an interference unit 207, the incoming control signal 304 is modified by introducing a sinusoidal interference according to an embodiment of the invention, in order to obtain a disrupted signal 305.

Then, in a control correction unit 208, control estimates 306 are determined from the disrupted signal 305 received.

These control estimates 306 are then modulated by a modulation unit 209. Next the modified control signal output from the modulation unit 209 is converted into an analog signal by a digital-to-analog converter DAC (not illustrated) to be supplied as input to the HRG 200.

Figure 3:
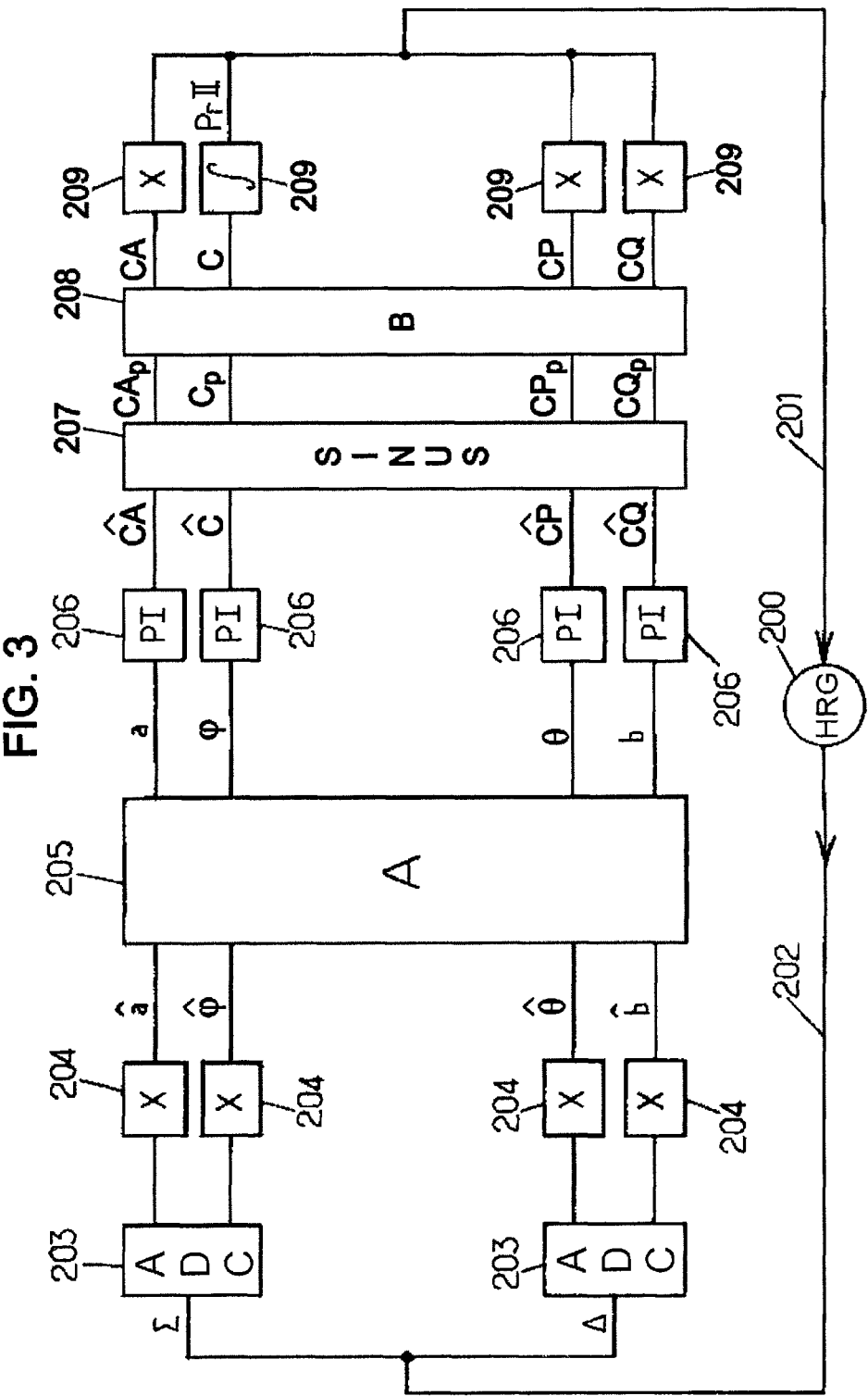
FIG. 3 illustrates the details of an embodiment of the invention applied to a plurality of operating parameters.

FIG. 3 provides a detailed illustration of an embodiment of the invention applied to a plurality of operating parameters. Here, the introduction of sinusoidal interferences according to an embodiment of the invention is managed in parallel for a plurality of operating parameter measurements or controls. The controls to be applied in the case illustrated, as well as the measurements from the gyroscope, are therefore relative to at least one operating parameter from among the following operating parameters:
- vibration amplitude;
- vibration phase;
- vibration position (also referred to as "angle of vibration");
- quadrature.

As described with reference to FIG. 2, the analog signal output from the gyroscope is converted to a digital signal by converters 203. The signal 202 output from the HRG 200 is separated into four signals respectively corresponding to the four operating parameters. It should be noted that two distinct paths are provided here: a first path Σ and a second path Δ.

A modulated amplitude signal and a modulated phase signal are output from the converter located in path Σ. A modulated angle signal and a modulated quadrature signal are output from the converter located in path Δ.

These four signals 302 are demodulated by demodulation 204 in order to obtain an estimate of an amplitude signal â, an estimate of a phase signal $\hat{\varphi}$, an estimate of an angle signal (or vibration position) $\hat{\theta}$, and an estimate of a quadrature signal $\hat{b}$.

Then these four signals are corrected in the correction unit 205 as described above. Here, this correction unit applies the respective correction values in the form of a matrix A.

The corrected amplitude, phase, angle, and quadrature values are therefore obtained as output from this matrix, which are respectively a, φ, θ and b. Next, each of these signals corrected by the measurement correction matrix A is integrated in parallel by integration units 206, PI. Controls relative to the corresponding operating parameters are then obtained in the form of respective control estimates: CÂ (control relative to the amplitude parameter), $\hat{C}$ (control relative to the phase parameter), $C\hat{P}$ (precession control relative to the vibration position parameter), $C\hat{Q}$ (control relative to the quadrature parameter).

Next, these controls are modified in order to obtain the modified controls to be applied to the vibrating gyroscope according to an embodiment of the invention, by introducing a sinusoidal interference.

This modification of the controls to be applied to the gyroscope 200 is done by means of the interference unit 207. The interference unit supplies disrupted signals CAp, Cp, CPp and CQp to be corrected using a control matrix B in the control correction unit 208. The modified control estimates CA, C, CP and CQ of the operating parameters to be applied to the vibrating gyroscope considered here are inventively collected as output from this matrix B.

These control estimates CA, C, CP and CQ are then modulated by a modulation unit 209. Next, the modified control signal output from the modulation unit 209 is converted to an analog signal by a digital-to-analog converter DAC (not illustrated) for input to the HRG 200.

The application of the invention to at least one of these controls allows calibration of the vibrating gyroscope.

It is possible to implement a calibration according to an embodiment of the invention quite easily, in a conventional mode or in a parametric mode.

Conventional mode is understood to mean the fact that the frequency of the control signal applied to the vibrating gyroscope is the same as the natural frequency of the vibrating gyroscope itself.

Parametric mode is understood to mean the fact that the frequency of the control signal applied to the vibrating gyroscope is twice the natural frequency of the vibrating gyroscope itself.

The following sections describe in detail the equations applied for an embodiment of the invention in conventional mode, in the general case and in a specific example. No limitation is attached to the applying of these equations and they are detailed below as examples.

In a general embodiment of the invention, the control signal C applied to the vibrating gyroscope and the resulting measurement value D in the signal output from the gyroscope are related in a conventional mode according to an equation of the type:

$$f(A,B)\ddot{D} + g(A,B)\dot{D} + h(A,B)D = C \quad (C1)$$

where f, g and h are a function of matrices A and B of the gyroscopic system concerned, matrix A being the electronic detection correction matrix and matrix B being the control matrix.

In one embodiment of the invention, a sinusoidal interference of an angular frequency denoted ω is injected into a current control in order to obtain a modified control in the control matrix. Neglecting second order harmonics, a set of equations is obtained as follows:

$$\begin{cases} C = C_0 + C_c \cos\omega t + C_s \sin\omega t \\ D = D_0 + D_c \cos\omega t + D_s \sin\omega t \end{cases}$$

where C is a current control corresponding to the incoming signal 201 and D is the resulting output signal 202;

where $C_0$, $C_c$, $C_s$ and $D_0$, $D_c$, $D_s$ are constants; and where ω is the angular frequency of the vibrating gyroscope.

In one embodiment, a sinusoidal interference is alternately applied to each of the controls of a plurality of controls. Thus for a control of index i among a plurality of n controls (therefore for i between 0 and n−1), one can write:

$$\begin{cases} C = C_{0i} + C_{ci}\cos\omega t + C_{si}\sin\omega t \\ D = D_{0i} + D_{ci}\cos\omega t + D_{si}\sin\omega t \end{cases}$$

where $C_{0i}$, $C_{ci}$, $C_{si}$ and $D_{0i}$, $D_{ci}$, $D_{si}$ are constants; and By successively deriving the signal D, one can write the following:

$$\begin{cases} D = D_{0i} + D_{ci}\cos\omega t + D_{si}\sin\omega t \\ \dot{D} = -\omega D_{ci}\sin\omega t + \omega D_{si}\cos\omega t \\ \ddot{D} = -\omega^2 D_{ci}\cos\omega t - \omega^2 D_{si}\sin\omega t \end{cases}$$

Then equation (C1) can be rewritten as follows:

$$-f(A,B)\omega^2 D_{ci} \cos \omega t - f(A,B)\omega^2 D_{si} \sin \omega t - g(A,B)\omega D_{ci}$$
$$\sin \omega t + g(A,B)\omega D_{si} \cos \omega t + h(A,B)D_{0i} + h(A,B)D_{ci}$$
$$\cos \omega t + h(A,B)D_{si} \sin \omega t = C_{0i} + C_{ci} \cos \omega t + C_{si} \sin \omega t$$

Next, by harmonic decomposition, the following set of equations can be obtained:

$$\begin{cases} h(A,B)D_{0i} = C_{0i} \\ -f(A,B)\omega^2 D_{ci} + g(A,B)\omega D_{si} + h(A,B)D_{ci} = C_{ci} \\ -f(A,B)\omega^2 D_{si} - g(A,B)\omega D_{ci} + h(A,B)D_{si} = C_{si} \end{cases}$$

The resolution of this last set of equations boils down to the resolution of a linear system. By applying a least squares method to the n relations obtained with the n controls taken into consideration, one can then identify the matrices A and B according to an embodiment of the invention.

In a second embodiment, applied to a specific example, an HRG can be modeled as a double-oscillator system with a mode x and a mode y.

A mechanical equation relative to this gyroscope can be as follows:

$$-\ddot{\eta}_1 + \omega_0^2 \eta_1 = F_1$$

$$-\ddot{\eta}_2 + \omega_0^2 \eta_2 = F_2$$

This system of equations can be written in the following vector form:

$$-\ddot{\eta} + \omega_0^2 \eta = F$$

where η is the position of vibration with $$\eta = \begin{bmatrix} \eta_1 \\ \eta_2 \end{bmatrix};$$

where $\omega_0$ is the angular frequency of the vibration (assumed here to be identical for the two modes x and y of the gyroscope concerned);

where F is the force applied to each of the modes x and y, with $$F = \begin{bmatrix} F_1 \\ F_2 \end{bmatrix},$$

this force being controlled by the control applied to the gyroscope.

It is assumed that the measurement signal, or the measurement, denoted X, meaning the observation of the gyroscope vibration, is made without error. Therefore we have:

$$\eta = X$$

It is assumed that there is a defect in the injection of the control, or controls, into the system. We have the following equation:

$$F = EU$$

where E is a defect matrix or error matrix that we are attempting to determine in order to correct the errors of the system and therefore calibrate the gyroscope.

The equation for the system is then written as follows:

$$\ddot{X} + \omega_0^2 X = EU$$

In an embodiment of the invention, a sinusoidal interference is injected into each control $U_i$, i being between 1 and n, n being the number of controls managed in this embodiment, each one corresponding to an operating parameter.

In such a context, the following equation is applied:

$$U_i = U_{0i} + U_{ci} \cos \omega_1 t + U_{si} \sin \omega_1 t$$

where $U_{0i}$ is a mean value of the control $U_i$ concerned;

where $U_{ci}$ is a cosine component of the control $U_i$ concerned; and where $U_{is}$ is a sine component of the control $U_i$ concerned.

To each control $U_i$ there corresponds a measurement value provided by the gyroscope, relative to an operating parameter, denoted $X_i$.

Such a measurement value satisfies the following equation:

$$X_i = X_{0i} + X_{ci} \cos \omega_1 t + X_{si} \sin \omega_1 t$$

The following equation can then be written:

$$\ddot{X} = -\omega_1^2 X_{ci} \cos \omega_1 t - \omega_1^2 X_{si} \sin \omega_1 t$$

Then, from the previous equation, the following system of equations is obtained:

$$\omega_0^2 X_{0i} = EU_{0i}$$

$$-\omega_1^2 X_{ci} + \omega_0^2 X_{ci} = EU_{ci}$$

$$-\omega_1^2 X_{si} + \omega_0^2 X_{si} = EU_{si}$$

It should be noted here that, for n different operating parameters with n being a positive integer, therefore relative to n different controls, the system of equations comprises 3n equations, for 4 unknowns if we take into consideration the four operating parameters listed above. The defect matrix E to be identified may be a matrix containing two rows and two columns.

There is a redundancy in the number of equations relative to the number of unknowns. As a result, such a system of equations can easily be resolved by a least squares estimation.

In an embodiment of the invention, n is equal to 4 (four controls of different types). In this case, the system of equations has 12 equations for four unknowns. It is then easy to obtain the error matrix E by least squares estimation. Next one can easily obtain the correction values to be applied in the control correction unit 207.

Then, on the basis of this error matrix, the respective correction values for the various operating parameters are deduced.

Figure 4:
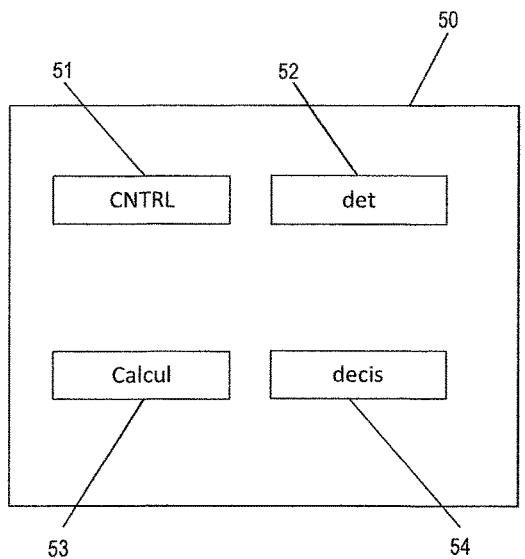
FIG. 4 illustrates a gyroscopic system according to an embodiment of the invention.

FIG. 4 illustrates a gyroscope system comprising, for calibrating the gyroscope:

a control unit 51 adapted to: obtain a modified control to be applied to the gyrometer for the operating parameter by introducing a sinusoidal interference into the current control, and to apply the modified control to the gyrometer as the current control;

a determination unit 52 adapted to determine a measurement value resulting from the current control;

a calculation unit 53 adapted to identify a correction value by correlating the measurement value with the applied modified control.

Such a system may additionally comprise:

a decision unit 54 adapted to decide, on the basis of the measurement value, whether to actuate the control, determination, calculation units.

The invention claimed is:

1. A method for calibrating a vibrating gyrometer to be calibrated in a gyroscopic system, the vibrating gyrometer supplying measurements and being controlled in a control loop, wherein a vibrating gyrometer is a vibrating gyroscope such that the position of vibration of the vibrating gyroscope is maintained in a fixed position, and the measurement supplied by the vibrating gyroscope is deduced from the control that must be applied to the vibrating gyroscope in order to maintain the gyroscope in the fixed position of vibration, said control loop corresponding to at least one current control for an operating parameter, said calibration method comprising the following steps in the control loop:
/a/ obtaining a modified control to be applied to the vibrating gyrometer for said operating parameter, wherein obtaining the modified control comprises disrupting the current control by introducing a sinusoidal interference;
/b/ applying the modified control to the vibrating gyrometer as the current control;
/c/ determining a measurement value resulting from step /b/; and
/d/ identifying a correction value for the operating parameter on the basis of a correlation between said measurement value and said modified control;
wherein said correction value is applied to next measurements supplied by the vibrating gyrometer.

2. The method for calibrating a vibrating gyrometer according to claim 1, wherein an equation associated with the control loop links a control applied to the vibrating gyrometer and a resulting measurement value; and wherein step /d/ is based on said equation.

3. The method for calibrating a vibrating gyrometer according to claim 1, further comprising the following step:
/e/ deciding, on the basis of step /d/, to repeat steps /a/ to /d/ as long as a convergence criterion is not satisfied.

4. The method for calibrating a vibrating gyrometer according to claim 3, wherein the convergence criterion is satisfied if the correction value for the operating parameter is less than a threshold value.

5. The method for calibrating a vibrating gyrometer according to claim 1, wherein the sinusoidal interference P satisfies the following equation:

$$P = k \sin(2\pi f_{mod})$$

where k is an amplitude value of the applied sinusoidal interference, and
where $f_{mod}$ is a value of the frequency of the sinusoidal interference applied.

6. The method for calibrating a vibrating gyrometer according to claim 1, wherein the measurements from the vibrating gyrometer are relative to an amplitude estimate, a phase error estimate, a position error estimate, or a quadrature estimate.

7. The method for calibrating a vibrating gyrometer according to claim 1, wherein the measurements from the vibrating gyrometer are supplied in vector form and are corrected using a detection matrix.

8. The method for calibrating a vibrating gyrometer according to claim 1, wherein the current control is relative to an operating parameter from among a parameter relative to an amplitude, a parameter relative to a stiffness, a parameter relative to a precession, and a parameter relative to a quadrature.

9. The method for calibrating a vibrating gyrometer according to claim 1, wherein the modified controls to be applied relative to operating parameters are determined in parallel in matrix form, using a control matrix.

10. The method for calibrating according to claim 1, wherein the control is at a frequency substantially equal to the natural frequency of the vibrating gyrometer.

11. The method for calibrating according to claim 1, wherein the control is at a frequency substantially two times greater than the natural frequency of the vibrating gyrometer.

12. A gyroscopic system comprising a vibrating gyrometer controlled in a control loop, said control loop corresponding to at least one current control for an operating parameter, wherein a vibrating gyrometer is a vibrating gyroscope such that the position of vibration of the vibrating gyroscope is maintained in a fixed position, and the measurement supplied by the vibrating gyroscope is deduced from the control that must be applied to the vibrating gyroscope in order to maintain the gyroscope in the fixed position of vibration, said gyroscopic system comprising, for calibrating the gyroscope:
a control unit adapted to obtain a modified control to be applied to the vibrating gyrometer for said operating parameter, wherein obtaining the modified control comprises disrupting the current control by introducing a sinusoidal interference, and to apply the modified control to the vibrating gyrometer as the current control;
a determination unit adapted to determine a measurement value resulting from the current control; and
a calculation unit adapted to identify a correction value for the operating parameter on the basis of a correlation between the measurement value and the modified control.

13. The gyroscopic system according to claim 12, further comprising:
a decision unit adapted to decide, on the basis of the measurement value, whether to actuate the control unit, the determination unit and the calculation unit.

* * * * *